(12) United States Patent
Allen

(10) Patent No.: US 7,454,115 B2
(45) Date of Patent: Nov. 18, 2008

(54) OPTICAL FIBER CLIPS, RANDOM ACCESS MANAGEMENT SYSTEMS INCLUDING CLIPS AND METHODS FOR USING THE SAME

(75) Inventor: Barry W. Allen, Siler City, NC (US)

(73) Assignee: Tyco Electronics Corporation, Middletown, PA (US)

( * ) Notice: Subject to any disclaimer, the term of this patent is extended or adjusted under 35 U.S.C. 154(b) by 106 days.

(21) Appl. No.: 11/585,042

(22) Filed: Oct. 23, 2006

(65) Prior Publication Data

US 2007/0104448 A1  May 10, 2007

Related U.S. Application Data

(60) Provisional application No. 60/729,648, filed on Oct. 24, 2005.

(51) Int. Cl.
*G02B 6/44* (2006.01)
(52) U.S. Cl. .................. 385/135; 385/136; 385/137
(58) Field of Classification Search .......... 385/134–137
See application file for complete search history.

(56) References Cited

U.S. PATENT DOCUMENTS

| | | | |
|---|---|---|---|
| 5,278,933 A | 1/1994 | Hunsinger et al. | |
| 5,323,480 A | 6/1994 | Mullaney et al. | |
| 5,535,298 A | 7/1996 | Fasnacht et al. | |
| 6,009,225 A | 12/1999 | Ray et al. | |
| 6,351,592 B1 | 2/2002 | Ehn et al. | |
| 6,363,198 B1 | 3/2002 | Braga et al. | |
| 6,424,781 B1 * | 7/2002 | Puetz et al. | 385/135 |
| 6,424,782 B1 | 7/2002 | Ray | |
| 6,850,687 B2 * | 2/2005 | Lavoie | 385/137 |
| 6,873,779 B1 * | 3/2005 | Sonderegger et al. | 385/136 |
| 6,892,020 B2 * | 5/2005 | Douglas et al. | 385/136 |
| 2002/0131750 A1 | 9/2002 | Holman et al. | |

FOREIGN PATENT DOCUMENTS

| | | |
|---|---|---|
| DE | 44 05 066 C1 | 5/1995 |
| DE | 195 10 386 A1 | 9/1996 |

OTHER PUBLICATIONS

Invitation to Pay Additional Fees for PCT/US2006/041342 mailed Feb. 23, 2007, 4 pages.
International Search Report and the Written Opinion of the International Searching Authority for PCT Application No. PCT/US2006/041342, mailed Jul. 23, 2007.

* cited by examiner

*Primary Examiner*—Hemang Sanghavi
(74) *Attorney, Agent, or Firm*—Myers Bigel Sibley & Sajovec, P.A.

(57) ABSTRACT

An optical fiber random access management (RAM) system is provided for use with an optical fiber termination device configured to selectively couple a first plurality of optical fibers to a second plurality of optical fibers. The RAM system includes a clip holder and a plurality of clips. The clip holder is configured to be mounted proximate the optical fiber termination device. The plurality of clips is positioned on the clip holder. Each of the clips is configured to releasably hold ends of a designated subset of the first plurality of optical fibers to provide access to a selected one of the ends of the subset of the first plurality of optical fibers within a predetermined one of the clips to couple the selected one of the ends of the subset of the first plurality of optical fibers to a corresponding designated one of the second plurality of fibers.

28 Claims, 8 Drawing Sheets

OPTICAL FIBER CLIPS, RANDOM ACCESS MANAGEMENT SYSTEMS INCLUDING CLIPS AND METHODS FOR USING THE SAME

RELATED APPLICATIONS

The present application claims priority from U.S. Provisional Application No. 60/729,648, filed Oct. 24, 2005, the disclosure of which is hereby incorporated herein in its entirety by reference.

BACKGROUND OF THE INVENTION

The present invention relates to optical fiber products and, more particularly, to optical fiber management products and methods for using the same.

Optical fiber networks are increasingly being installed to support high speed voice and data communications. Increasingly, the optical fiber coupling is being expanded out from the central office of the communication service provider companies, such as Regional Bell Operating Companies (RBOCs), to the subscriber locations, such as homes or businesses, where conventional copper wiring was conventionally used.

SUMMARY OF THE INVENTION

Embodiments of the present invention include an optical fiber random access management (RAM) system for use with an optical fiber termination device configured to selectively couple a first plurality of optical fibers to a second plurality of optical fibers. The RAM system includes a clip holder and a plurality of clips. The clip holder is configured to be mounted proximate the optical fiber termination device. The plurality of clips is positioned on the clip holder. Each of the clips is configured to releasably hold ends of a designated subset of the first plurality of optical fibers to provide access to a selected one of the ends of the subset of the first plurality of optical fibers within a predetermined one of the clips to couple the selected one of the ends of the subset of the first plurality of optical fibers to a corresponding designated one of the second plurality of fibers.

According to some embodiments, each clip is manually operable.

According to some embodiments, the clips are positioned on the clip holder so as to define an ordered array of the clips. The clips may be configured and arranged on the clip holder to provide a nominal spacing between adjacent ones of the clips of at least about 1 inch.

According to some embodiments, each clip includes a clip member including a pair of opposed clip arms defining a receiving slot therebetween, and the clip member is selectively movable between an open position, wherein the pair of opposed clip arms are separated or separable to permit insertion of a bundle of optical fibers into the receiving slot, and a closed position, wherein the pair of opposed clip arms are held together to secure a bundle of optical fibers in the receiving slot. According to some embodiments, each clip further includes a clip housing, the clip member thereof is mounted on the clip housing, and the clip member is slidable with respect to the clip housing between the open position and the closed position. The clip may further include a biasing member operative to load the clip member against the clip housing to provide an interference fit between the clip member and the clip housing to hold the clip member in at least one of the open and closed positions. According to some embodiments, each clip housing defines a slide channel within which the clip member slides between its open and closed positions. In some embodiments, each clip member has a slide stroke length of between about 0.5 and 1.5 inches from its closed position to its open position. According to some embodiments, each clip includes a stop structure to limit a sliding distance of the clip member with respect to the clip housing. According to further embodiments, at least one of the clip arms of each clip is formed of a bendable material to enable cantilevered bending of the at least one clip arm when the respective clip member is in its open position.

According to further embodiments, each clip includes a contact pad mounted on a clip arm thereof that is configured to engage a plurality of optical fibers in the receiving slot. The clip arm is formed of a first material having a first hardness. The pad is formed of second material having a second hardness that is softer than the first hardness. In some embodiments, the second hardness is between about 3 and 25 Shore A.

According to some embodiments, the RAM system further includes at least one spool configured to be mounted in and/or on the optical fiber termination support device to receive and guide the first plurality of optical fibers.

According to some embodiments, the first plurality of optical fibers are subscriber optical fibers associated with respective subscriber locations, and the second plurality of optical fibers are coupled to one or more optical splitters associated with one or more optical feed cables coupled to a central office of a telecommunications provider.

According to some embodiments, an optical fiber termination assembly includes a RAM system as described above and further includes: a termination support structure, wherein the clip holder is mounted proximate the termination support structure; at least one optical splitter mounted proximate the termination support structure; at least one splice tray mounted proximate the termination support structure; at least one spool mounted proximate the termination support structure; the first plurality of optical fibers including a plurality of subsets of optical fibers, wherein the first plurality of optical fibers extends around a portion of the spool and each of the subsets of optical fibers of the first plurality of optical fibers is releasably held in a respective one of the plurality of clips; and the second plurality of optical fibers, wherein the second plurality of optical fibers is coupled to the at least one optical splitter. According to some embodiments, the optical termination assembly is a splitter cabinet.

According to further embodiments of the present invention, an optical fiber clip for managing loose individual optical fibers includes a clip housing and a clip member mounted on the clip housing. The clip member includes a pair of opposed clip arms defining a receiving slot therebetween. The clip member is selectively manually slidable with respect to the clip housing between an open position, wherein the pair of opposed clip arms are separated or separable to permit insertion of a bundle of optical fibers into the receiving slot, and a closed position, wherein the pair of opposed clip arms are held together to secure a bundle of optical fibers in the receiving slot.

According to further embodiments of the present invention, a method is provided for managing optical fibers in an optical fiber termination device wherein a first plurality of optical fibers is to be selectively coupled to a second plurality of optical fibers. The method includes: providing an optical fiber random access management (RAM) system proximate the optical fiber termination device, the RAM system including a clip holder and a plurality of manually operable clips mounted on the clip holder; capturing ends of a designated subset of the first plurality of optical fibers in a predetermined one of the clips; thereafter selectively releasing and removing a selected one of the ends of the subset of the first plurality of optical fibers from the predetermined clip; and thereafter coupling the selected one of the ends of the subset of the first plurality of optical fibers to a corresponding designated one of the second plurality of fibers.

DETAILED DESCRIPTION OF EMBODIMENTS OF THE INVENTION

Figure 1:
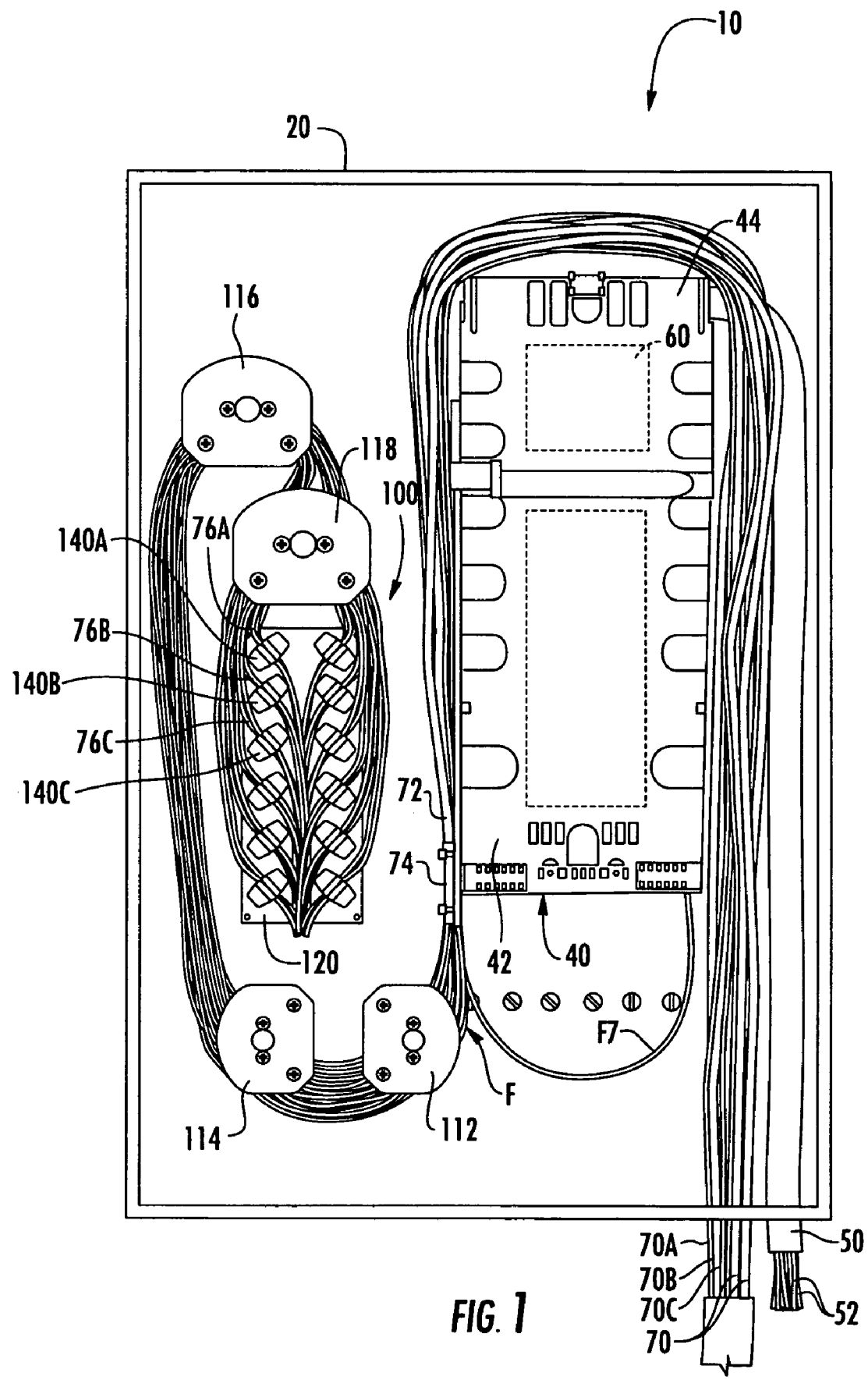
FIG. 1 is a front view of an optical fiber termination device including a RAM system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Various embodiments of the present invention provide methods and systems for managing, storing, and handling optical fibers in optical fiber networks as will now be described with reference to the embodiments illustrated in the figures.

Optical fiber clips, random access management (RAM) systems and methods according to embodiments of the present invention may be used in various locations and for management of various types of termination devices. According to some embodiments, optical fiber clips, random access management (RAM) systems and methods according to embodiments of the present invention may be used for the storage and management of subscriber optical fibers in a system employing one or more optical splitters, and some embodiments of the invention will hereinafter be described in such systems and related devices and methods. However, it will be appreciated that various embodiments of the present invention may be employed or incorporated into other types of optical fiber handling systems and related devices and methods.

Figure 8:
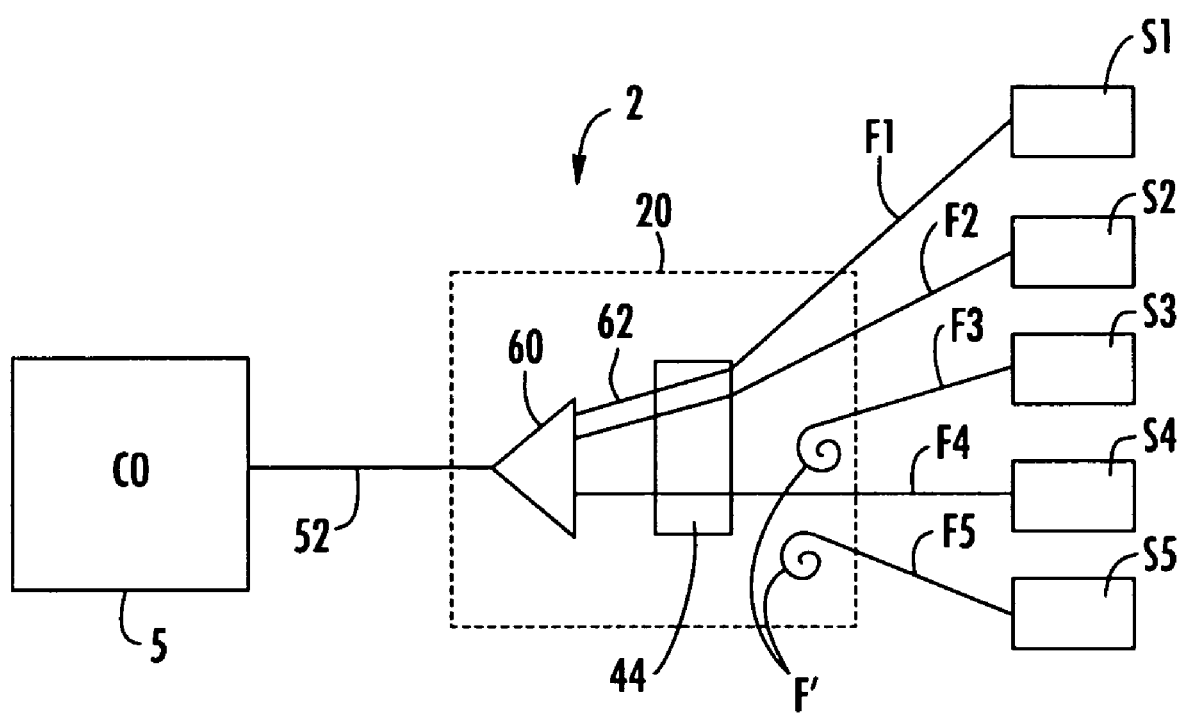
FIG. 8 is a schematic diagram of an exemplary system for use of optical fiber clips, RAM systems, optical fiber termination devices, and methods according to embodiments of the present invention.

Embodiments of the present invention may be utilized for unassigned fiber optic management and storage apparatus used in closures, cabinets, boxes, pedestals, shelves and the like. FIG. 8 illustrates an exemplary system 2 where embodiments of the present invention may be advantageously employed. The exemplary system 2 may be commonly referred to as a centralized splitter network architecture and utilizes electronics and lasers located in a Central Office (CO) 5 to provide service to multiple customers or subscribers (e.g., potentially subscribers S1, S2, S3, S4, S5) over a single fiber 52. The fiber 52 leaving the CO 5 is typically routed to a geographically convenient point near the customer service area. The signal at this point is then generally routed through an optical splitter 60 in a centralized or optical splitter cabinet 20. The optical splitter 60 converts each input fiber into "n" number of active fibers. Splitters are typically referred to as 1×n where "n" represents the number of output fibers or "ports." Each port of the splitter may be terminated with a connector and can provide full service to a subscriber (i.e., a customer who has signed up for service from the provider). Splitters may be added individually or in groups (e.g., two 1×32 splitters) due to the fact that each input fiber 52 from the CO 5 is typically spliced, a procedure that generally requires set up and a higher skilled technician than is usually required for general service.

With two 1×32 splitters, 64 active ports are available on the splitters for assignment. These ports are referred to as stranded until subscribers take service and are coupled to the ports. Thus, with only one subscriber on the network, 63 ports are stranded. This process of connecting customers as subscribers typically occurs at a cabinet, such as the centralized splitter cabinet 20 that incorporates a connector field (i.e., an array of connectorised fibers that permit easy mating, de-mating and reassignment of fibers via pigtails) or a splice tray sufficiently sized to provide each prospective subscriber S1, S2, S3, S4, S5 with a fiber optic connection point.

For the purposes of explanation, five potential subscribers S1-S5 are illustrated in FIG. 8; however, it will be appreciated that fewer or more potential subscribers may be associated with the cabinet 20. Each subscriber S1-S5 has a respective optical fiber associated therewith. The optical fibers F1, F2, F3, F4, F5 are each terminated at the respective subscriber or potential subscriber S1, S2, S3, S4 and pre-routed to the cabinet 20 in anticipation of possible eventual subscription. At a given point in time, some subscribers (e.g., S1, S2 and S4) may be coupled via their fibers (e.g., fibers F1, F2 and F4) to the splitter 60 to provide service to these subscribers while other subscribers (e.g., subscribers S3 and S5) are not coupled to the splitter and the ends of their fibers (e.g., the ends F' of fibers F3 and F5), though present in the cabinet 20, remain unassigned (i.e., not coupled to the splitter). This architecture, like other aspects of an optical fiber network, generally requires handling of a large number of individual optical fibers, taking care to avoid damaging the fibers and to keep track of which fiber is routed to which location. In particular, there may be a substantial number of "unassigned" fiber ends of subscriber fibers in the cabinet 20 that have not yet been coupled to a splitter. It may be desirable to maintain these subscriber fiber ends in a safe and orderly fashion. Moreover, as it may later be necessary to match a specific unassigned subscriber fiber (e.g., the fiber F3) corresponding to a specific subscriber geographic location (e.g., location S5) with a corresponding designated port of a splitter, it is desirable that the nonconnected subscriber fibers be easily identifiable and locatable to save time and effort when connection is needed. Because connection of the subscribers to the splitter may not occur in sequence, the subscriber fibers often must be randomly accessed.

Figure 9:
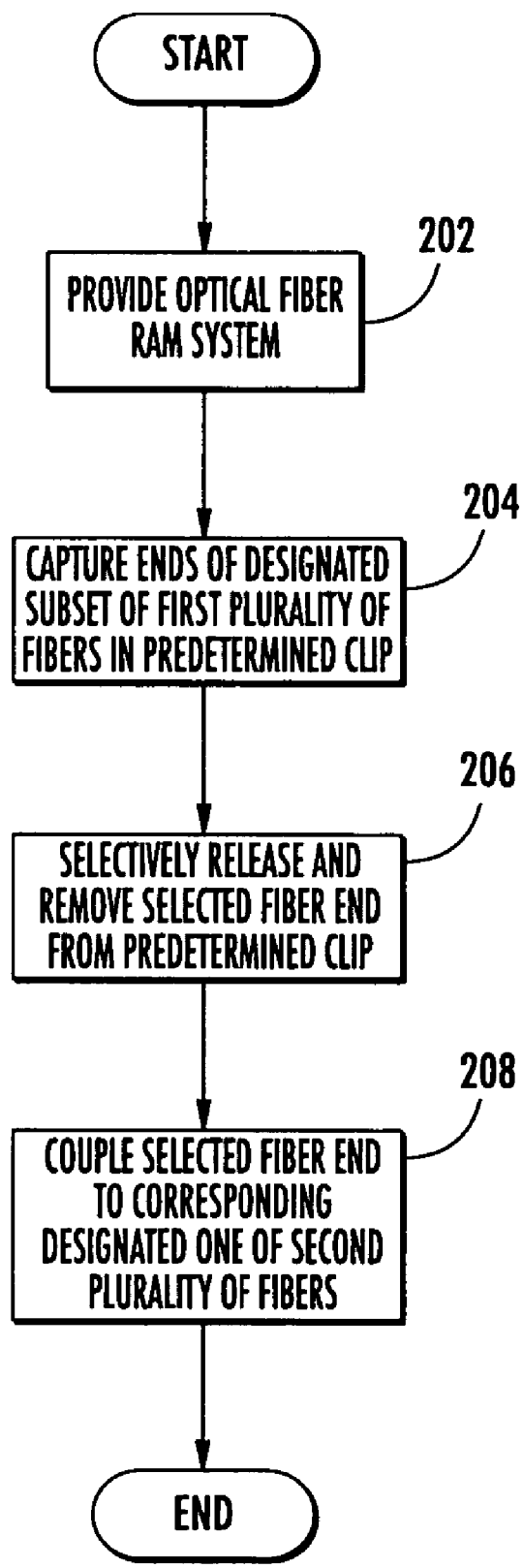
FIG. 9 is a flowchart illustrating methods according to some embodiments of the present invention.

Methods of managing optical fibers according to various embodiments of the present invention will now be described with reference to the figures. Referring first to the flowchart illustration of FIG. 9, methods are provided for managing optical fibers in an optical fiber termination support device wherein a first plurality of optical fibers is to be selectively coupled to a second plurality of optical fibers. An optical fiber random access management (RAM) system is provided proximate the optical fiber termination support device (Block 202). The RAM system includes a clip holder and a plurality of manually operable clips mounted on the clip holder. Ends of a designated subset of the first plurality of optical fibers are captured in a predetermined one of the clips (Block 204). Thereafter, a selected one of the ends of the subset of the first plurality of optical fibers is selectively released and removed from the predetermined clip (Block 206). The step of Block 206 may include removing others (including all) of the subset of fibers and returning the others. Thereafter, the selected one of the ends of the subset of the first plurality of optical fibers is coupled to a corresponding designated one of the second plurality of fibers (Block 208). For example, the first plurality of optical fibers may be coupled to a second plurality of fibers extending to a splice tray or connection panel associated with a central office of the like for use in providing service selectively to ones of the subscribers associated with respective optical fibers included in the first plurality of fibers.

Optical fiber management systems and methods of using the same according to some embodiments of the present invention will now be further described with reference to FIGS. 1-7 wherein an optical fiber termination device 10 (FIG. 1) according to embodiments of the present invention is shown. The device 10 includes an enclosure or other support structure 20 and a RAM system 100 according to embodiments of the present invention disposed proximate (e.g., in and/or on) the enclosure 20. The RAM system 100 includes a plurality of optical fiber clips 140 (including clips 140A, 140B, 140C discussed below) according to embodiments of the present invention.

The RAM system 100 further includes a clip holder 120, which may be a rigid plate or otherwise configured. The clip holder 120 may be secured to the enclosure by fasteners through mount holes 122 defined in the clip holder 120. The clips 140 are mounted on the clip holder. According to some embodiments, the clips 140 are secured in holes 124 in the clip holder 120. According to some embodiments, the clips 140 are arranged on the clip holder 120 in a defined array. As illustrated, the clips 140 are configured in a matrix or array 170 (FIG. 2) including two vertical rows 172, 174 that define a vertical trough or passage 176 therebetween. According to some embodiments, the clips 140 are spaced apart with a nominal spacing D2 (FIG. 2) of at least about 1 inch. According to some embodiments, the clips 140 extend a distance D4 (FIG. 3) of at least 1 inch beyond the front of the clip holder 120.

Turning to the clips 140 in more detail, an exemplary clip 140A is shown in FIGS. 4-7. Some or all of the remaining clips 140 may be constructed in the same manner and it will be appreciated that the following description may likewise apply to these other clips 140.

The clip 140A includes a clip housing 142. The clip housing 142 defines an end opening 148 and opposed elongate slots 144, 146 communicating with the end opening 148. The clip housing 142 further defines an elongate channel 145 communicating with the opening 148 and a side slot 149 communicating with the channel 145. While illustrated as a full length slot, the slot 144 may be shortened like the slot 146 to further enclose or box in the channel 145.

A clip member 150 is slidably mounted in the channel 145 of the clip housing 142. The clip member 150 includes opposed elongate clip arms 152, 154, which define a gap therebetween. A fixed limiter or stop structure 156 is provided on the clip arm 152 to slide within the slot 149. The stop structure 156 may be integrally formed with or affixed to the clip arm 152. Each clip arm 152, 154 has a respective grip or handling structure 158 configured to facilitate manual operation of the clip member 150 such as by providing convenient and effective features for engaging with ones fingers. According to some embodiments, each handling structure 158 has a height D7 (FIG. 5) of between about 0.125 and 0.25 inch. A pad 162 is affixed (e.g., by adhesive) to and between each of the clip arms 152, 154 adjacent the front end of the clip member 150 in a fiber engagement region. The pad 162 may be U-shaped to define a receiving slot 164. According to some embodiments, the receiving slot 164 has a depth D3 (FIG. 5) of at least about 1 inch and, according to some embodiments, between about 1 and 1.5 inches. According to some embodiments, the slot 164 has a width D6 (FIG. 5) of between about 0.375 and 0.625 inch. A biasing member 160 is affixed (e.g., by adhesive) to and between each of the clip arms 152, 154 adjacent the midsection of the clip member 150.

The components of the clip 140 may be formed of any suitable material(s). According to some embodiments, the clip arms 152, 154 are formed of a bendable, resilient material, such as a polymeric material (e.g., nylon). According to some embodiments, the biasing member 160 is formed of an elastomer and, according to some embodiments, an elastomeric foam. According to some embodiments, the pad 162 is formed of an elastomer and, according to some embodiments, an elastomeric foam such as a silicone foam, polyurethane, or neoprene. According to some embodiments, the pad 162 is formed of a material having a durometer or hardness less than the durometer or hardness of the adjacent portions of the clip arms 152, 154. According to some embodiments, the pad 162 is formed of a material having durometer or hardness of between about 3 and 25 Shore A. According to some embodiments, the clip arms 152, 154 may be unitarily injection molded with the pad 162 included in the part during the injection molding process.

Figure 5:
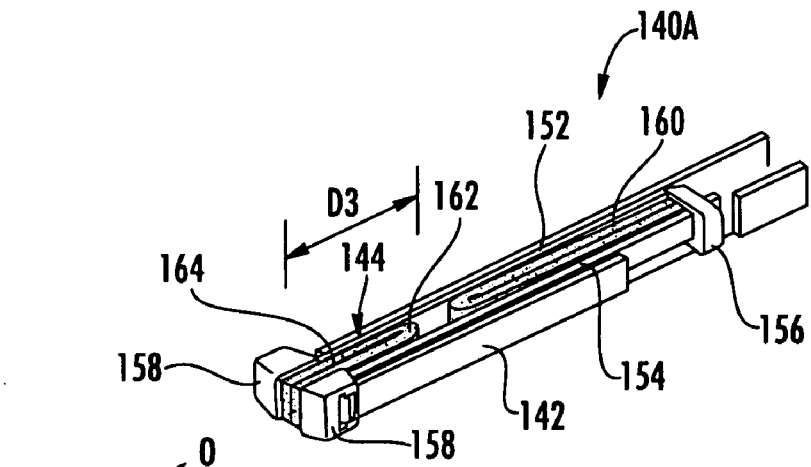
FIG. 5 is a front perspective view of the clip of FIG. 4 in a closed position.
Figure 6:
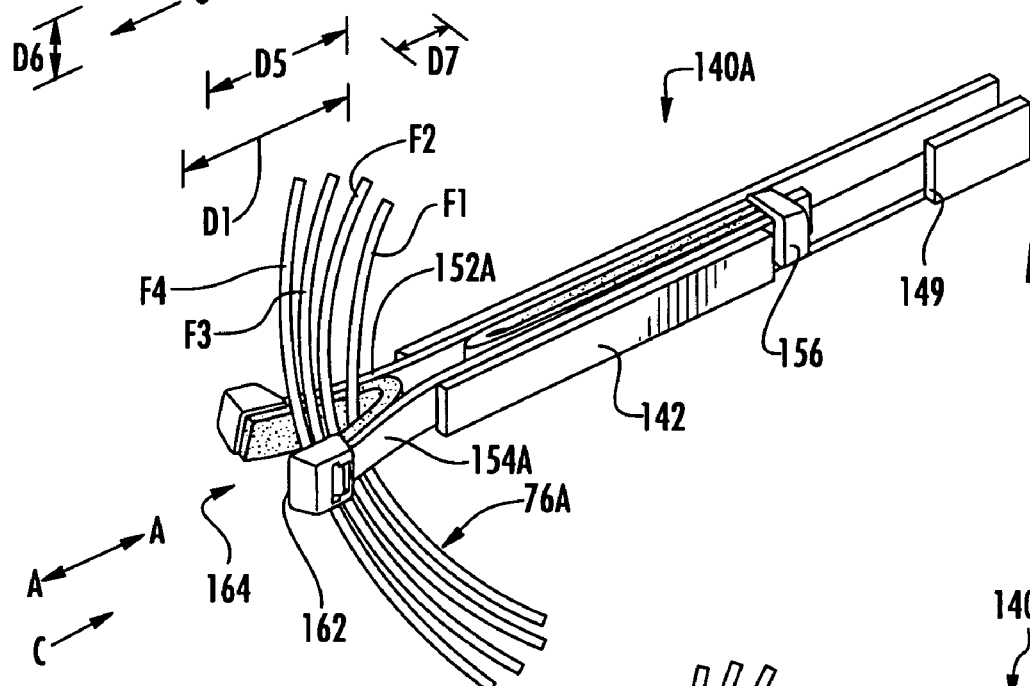
FIG. 6 is a front perspective view of the clip of FIG. 4 in an open position with a bundle of optical fibers inserted therein.
Figure 7:
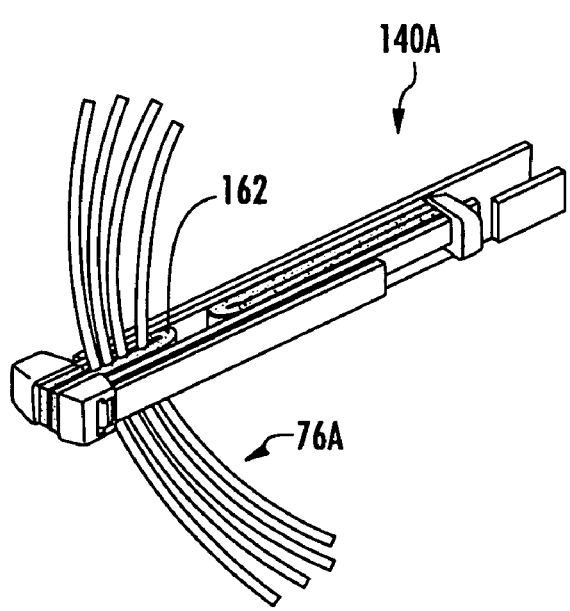
FIG. 7 is a front perspective view of the clip of FIG. 4 in the closed position with the bundle of optical fibers of FIG. 6 captured by the clip.

The optical fiber clip 140A may be used to releasably hold or capture one or more optical fibers as follows. The clip member 150 is slidable relative to the housing 142 between a closed position as shown in FIGS. 5 and 7 and an open position as shown in FIG. 6. With the clip 140A in the closed position of FIG. 5, the operator may grasp the handling structures 158 with his or her fingers and pull the clip member 150 in the direction O relative to the housing 142 (e.g., while the housing 142 is held in place). In this manner, the clip member 150 can be withdrawn a travel or stroke distance D5 (FIG. 6) to the extended or open position. According to some embodiments, the stroke distance D5 is at least about 0.5 inch and, according to some embodiments, between about 0.5 and 1.5 inches. According to some embodiments, the stop structure 156 slides in the slot 149 and limits withdrawal of the clip member 150 from the housing 142. The respective limits for the open and closed positions may be set by the slot 149 and the stop 156.

When the clip member 150 is in the extended (open) position, sections 152A, 154A of the clip arms 152, 154 will extend a distance D1 (FIG. 6) beyond the front end of the housing 142. According to some embodiments, the distance D1 is at least about 0.625 inch and, according to some embodiments, between about 0.625 and 1.75 inches. With the clip arms 152, 154 positioned in this manner, the operator may then insert an individual or set or bundle 76A of optical fibers F1, F2, F3, F4 into the receiving slot 164. The material memory of the clip arms 152, 154 and/or of the pad 162 may cause the sections 152A, 154A to bend or cantilever outwardly and/or the operator may manually bend the sections 152A, 154A apart to widen the receiving slot 164 to facilitate insertion of the fibers (e.g., as shown in FIG. 6).

After the fibers F1-F4 are positioned in the slot 164, the operator may slide the clip member 150 back into the housing 142 in the direction C (FIG. 6) to return the clip member 150 to the closed position. In doing so, the sections 152A, 154A are forced toward one another by the housing 142 to apply a clamping force to the pad 162, which in turn clamps onto the fibers F1-F4. The fibers F1-F4 extend through the side slots 144, 146.

The friction characteristics and resilient deformability of the pad 162 material may provide a secure grip on the fibers F1-F4 without requiring loading that may break or damage the fibers. Moreover, the soft, deformable pad material may prevent or reduce the occurrence of point loading or acute bending forces in the fibers that may damage the fibers.

The operator may repeatedly thereafter again slide the clip member 150 to the open position and selectively remove one or more of the fibers F1-F4 and/or insert additional optical fibers. Thereafter, the operator may slide the clip member 150 back into the closed position to capture the remaining and/or newly inserted fibers.

The biasing member 160 provides an interference fit between the clip member 150 and the housing 142 in each of the open and closed positions of the clip and when transitioning therebetween. In this way, the biasing member 160 may serve to retain the clip member in the closed position until deliberately opened, and to retain the clip member in the open position for the operator's convenience in handling. Additionally or alternatively, the clip arms 152, 154 may be molded or shaped such that in a relaxed condition sections of the clip arms 152, 154 adjacent the front end of the clip member 150 (e.g., sections 152A, 154A) angle outwardly to bias the clip arms 152, 154 against the housing 142.

Figure 2:
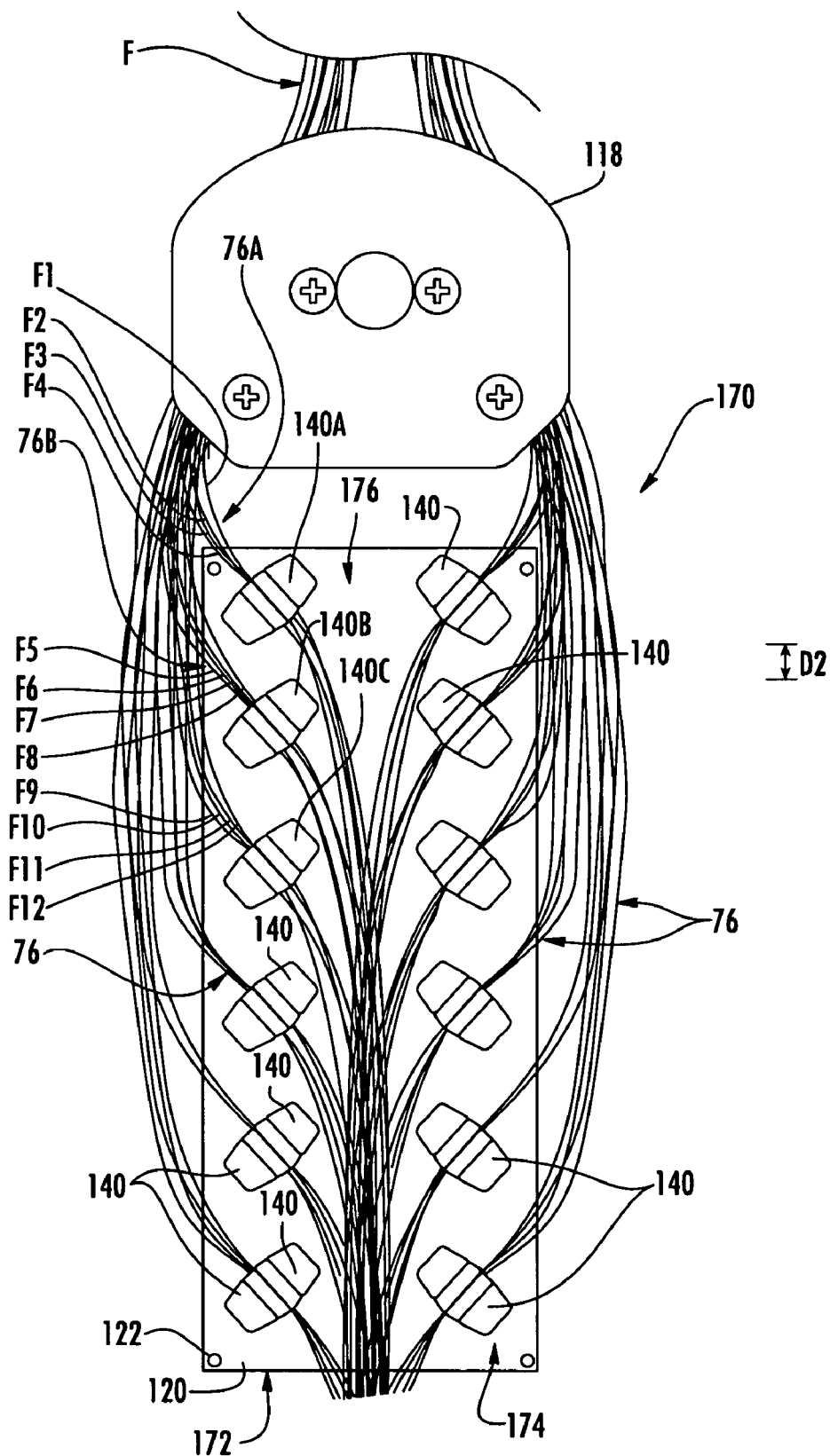
FIG. 2 is an enlarged, fragmentary front view of the optical fiber termination device of FIG. 1.
Figure 3:
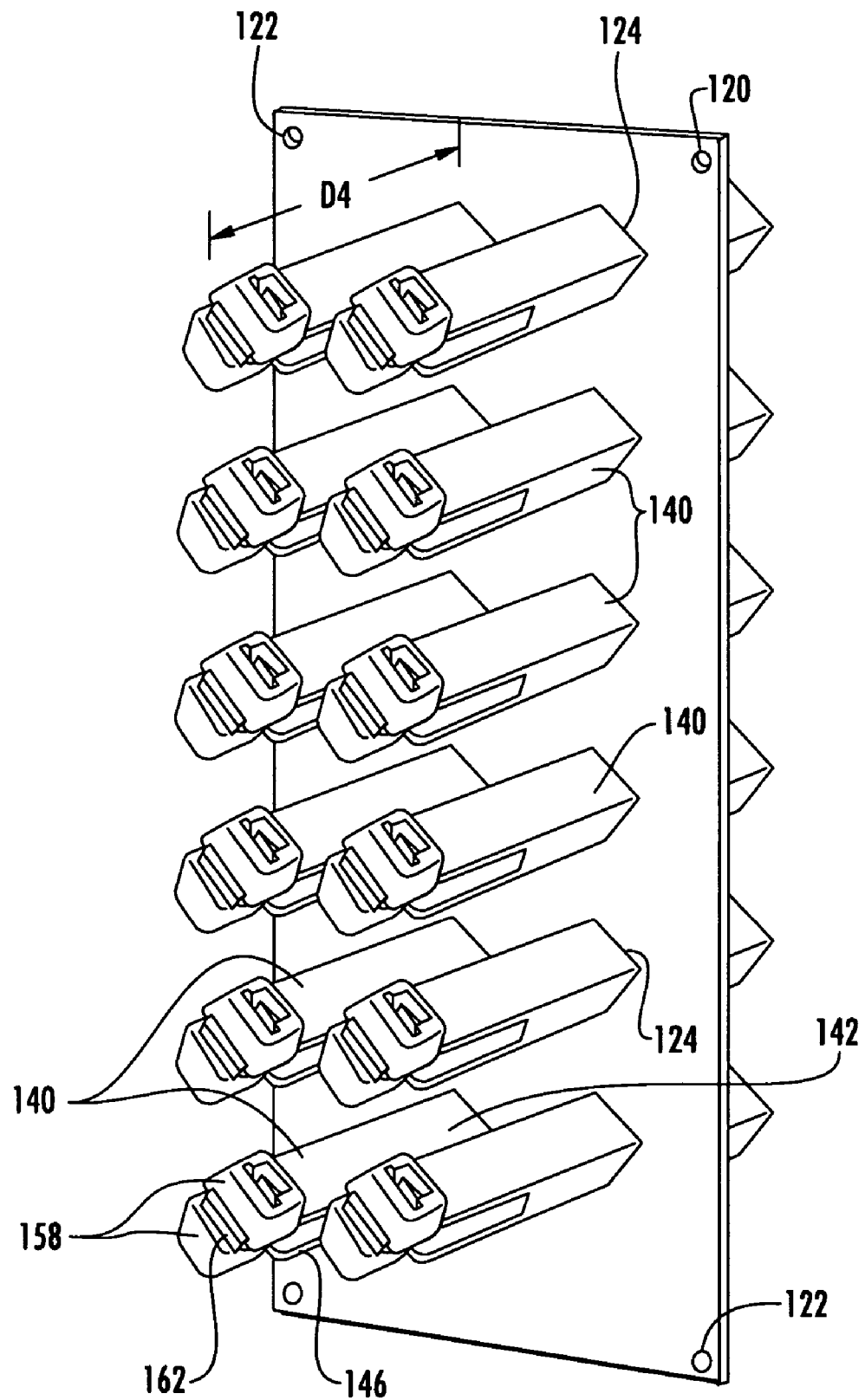
FIG. 3 is a front perspective view of a clip holder and a plurality of clips forming a part of the RAM system of FIG. 1.
Figure 4:
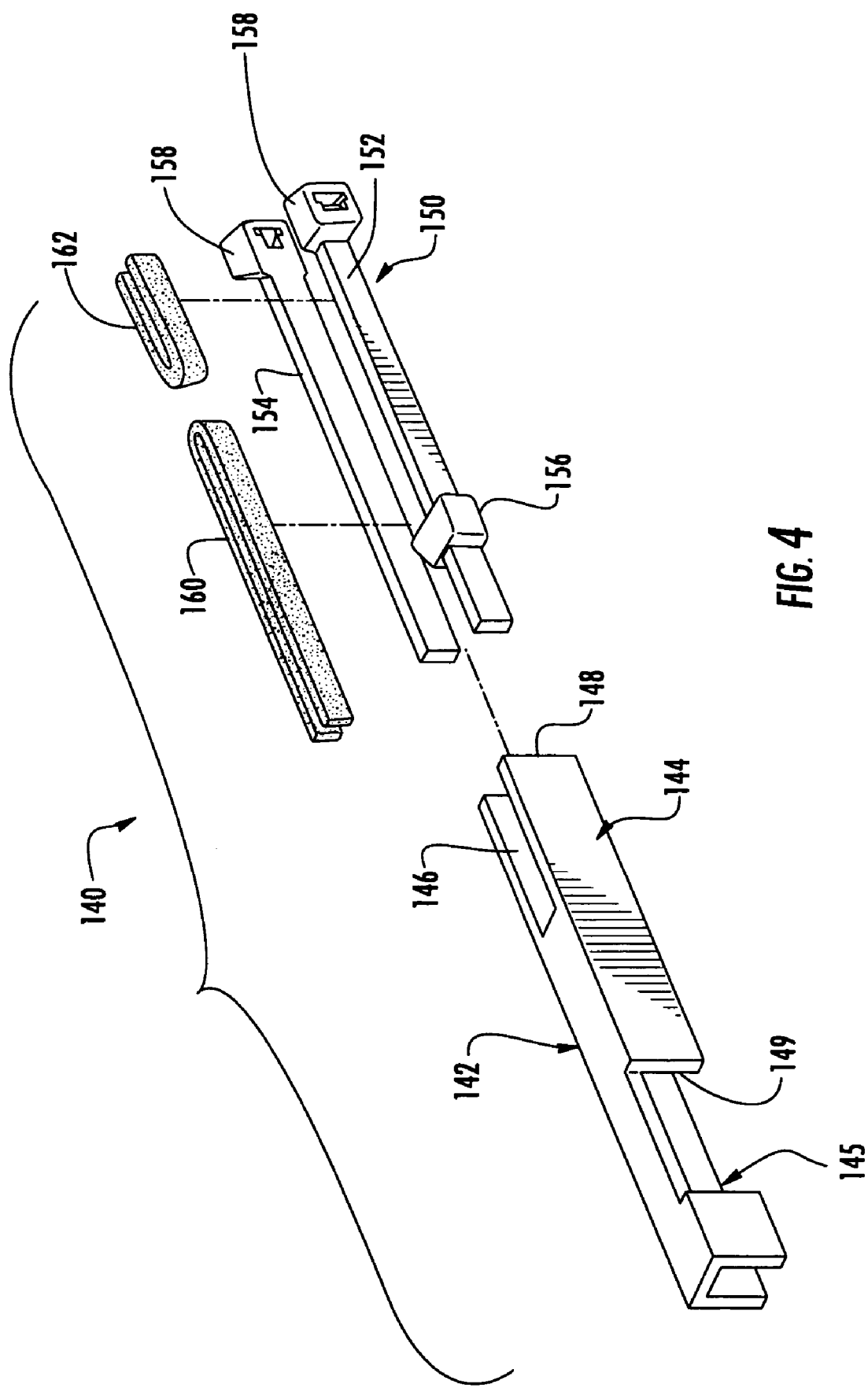
FIG. 4 is an exploded, rear perspective view of a clip forming a part of the RAM system of FIG. 1.

The RAM system 100 illustrated in FIGS. 1 and 2 further includes a plurality of spools 112, 114, 116, 118. The spools 112, 114, 116, 118 maybe secured to the enclosure 20.

A splitter/splice tray 40 is also mounted in the enclosure 20. The splitter/splice tray 40 includes a splitter connection section 44 and a subscriber splice section 42. The splitter/splice tray 40 may be of any suitable construction. One or more splitters 60 are mounted in the splitter connection section 44.

An optical fiber feed cable 50 extends into the enclosure 20. The fiber feed cable 50 includes one or more optical fibers 52 (which may be regarded as a second plurality of optical fibers) from the CO 5 that extend into the tray 40 and are coupled to the splitter or splitters 60 on the CO side of the splitter(s) 60.

A plurality of subscriber bundle cables 70 (including subscriber bundle cables 70A, 70B, 70C discussed below) also extend into the enclosure 20. Each subscriber bundle cable 70 includes a plurality or bundle 76 of subscriber optical fibers F (including optical fiber bundles 76A, 76B, 76C discussed below) surrounded by a respective jacket 72. The optical fibers F (including optical fibers F1-F12 discussed below) of the bundles 76 may be regarded collectively as a first plurality of optical fibers. According to some embodiments, the optical fibers F are 900 micron fibers or 250 micron bare fibers; however, other sizes of fibers may be used.

As illustrated, the subscriber bundle cables 70 extend over the tray 40 to respective strain relief structures 74 (e.g., tubing and tie wraps; only one shown in FIG. 1). The jackets 72 are removed at or downstream of the strain reliefs 74 so that remaining lengths of the optical fibers F of the bundles 76 extend uncovered. It will be understood, however, that the uncovered individual fibers F typically include some form of outer protective coating.

The uncovered lengths of the optical fibers F are routed around the spools 112, 114, 116 as shown to control bend radius characteristics during routing. Thereafter, the optical fibers F are divided or bifurcated about the spool 118. Designated ones of the optical fibers F extend to the left side of the spool 118 and are routed to respective clips 140 of the clip row 172 and other designated ones of the optical fibers F extend to the right side of the spool 118 and are routed to respective clips 140 of the clip row 174.

The ends of at least some of the fibers F are releasably secured in the clips 140. According to some embodiments, the fiber ends are releasably secured in respective predetermined clips in accordance with a logical or prescribed schema. According to some embodiments, subsets of the optical fibers F are secured in predetermined respective ones of the clips 140 to facilitate subsequent random access to the optical fibers F that have not yet been assigned (i.e., have not been coupled to a splitter 60). In particular, unassigned subscriber fibers F can be grouped and secured in a manner that permits convenient tracking and random access.

According to some embodiments, each bundle 76 is assigned to a predetermined respective one of the clips 140. That is, the unassigned fibers F from each respective cable 70 are installed in a corresponding predetermined clip 140. According to some embodiments, the assigned fibers F, if any, of a bundle 76 are not installed in the predetermined clip 140, but are instead routed to the splice tray 40 and coupled to the splitter 60. When an operator wishes to locate a given or designated unassigned subscriber fiber lead F in order to connect that fiber F to the splitter 60, the operator need only determine the fiber number and then locate the designated fiber F in accordance with the predetermined positioning schema. The applicable schema or protocol for assigning the fibers to the clips 140 may be indicated by labels in the enclosure 20, on the clip holder 120 or otherwise. Within a bundle 76A, 76B, 76C from the respective cable 70A, 70B, 70C, color coding may be used to identify individual optical fibers F.

By way of example and in accordance with some embodiments, the subscriber fibers F may be supplied from a plurality of subscriber bundle cables 70 (as illustrated, twelve). Each cable 70 may include a plurality of fibers (as illustrated for the purpose of clarity, four; however, other numbers (such as twelve) may be more typical). With reference to FIGS. 1, 2, 6 and 7, the fibers F may be uniquely identified as fibers 1, 2, 3, 4 . . . 48, with subscriber fibers 1-4 (shown in the drawings as fibers F1-F4) being provided as a subset or bundle 76A in a first cable 70A, subscriber fibers 5-8 (shown in the drawings as fibers F5-F8) being provided as a subset or bundle 76B in a second cable 70B, subscriber fibers 9-12 (shown in the drawings as fibers F9-F12) being provided as a subset or bundle 76C in a third cable 70C, and so forth.

In the exemplary schema of FIG. 2, the bundles 76 are assigned to the clips in serial order down the first column 172 and then down the second column. Thus, the first bundle 76A (i.e., fibers F1-F4) is installed in the clip 140A, the second bundle 76B (i.e., fibers F5-F8) is installed in the clip 140B, and the third bundle 76C (i.e., fibers F9-F12) is installed in the clip 140C. If, for example, the operator wishes to locate subscriber fiber 7 (fiber F7), the operator can refer to the predetermined schema or protocol to determine that fiber F7 will be located in clip 140B. The operator may distinguish the fiber F7 from the other fibers in the clip 140B by reference to another prescribed designator, such as fiber coating color. For example, the lowest number fiber in each bundle or subset may be colored red so that the red fibers in the clips 140A, 140B and 140C can be readily identified as fibers F1, F5 and F9, respectively.

Once the operator has located the desired subscriber fiber, the operator can remove the selected fiber end from the clip 140 in which it is secured. More particularly, the operator can open the clip 140, remove the fiber end, and re-close the clip 140 as discussed above with regard to operation of the clip 140A. The freed fiber end can then be re-routed in the enclosure 20 to the splice tray 40 and spliced or otherwise coupled to the splitter 60. For example, the fiber F7 can be removed from the clip 140B (FIG. 2) and re-routed to the splice tray 40 a shown in FIG. 1.

Once assigned and removed from the RAM system 100, the subscriber fibers F can be coupled to the splitter 60 by any suitable method. For example, the splitter may include fiber ends to which the subscriber fibers are spliced (e.g., by fusing or mechanical splice) in the splice tray 42. The subscriber fiber ends may be connectorized or pigtailed with mechanical connectors, such as FC or SC type connectors. The fiber ends as stored in the clips 140 may be connectorized.

According to some embodiments, the RAM system 100 is configured and positioned to ensure that at least a minimum bend radius is maintained for each of the fiber ends routed to and installed in the RAM system 100. According to some embodiments, the clip receiving slots 164 are angled with respect to vertical by the orientation of the clip 140 on the clip holder 120 as shown in FIG. 2. According to some embodiments, the slots 164 form an angle of between about 40 and 50 degrees with respect to vertical. According to some embodiments and as shown in the drawings, the receiving slots 164 of the rows 172 and 174 of clips 140 are angled with respect to the length of the central passage 176 to direct all of the stored fibers F into the central passage 176. According to other embodiments, the fibers by be directed nonvertically to another support (e.g., a downstream spool), in which case the receiving slots 164 may be angled with reference to such other support to limit bend of the fibers.

According to some embodiments, each fiber clip 140 is configured to capture and hold at least twelve 900 micron fibers.

Various methods have been used in the past with optical fibers, such as bundling with Velcro loops or twist ties. However these generally require significant participation from the operator to ensure that they are re-bundled and properly stored and that no fasteners are over tightened, thus causing damage to the fibers. Accessing a particular fiber from a bundle of fibers has proven difficult in the past. This is a common practice at fiber distribution hubs found in many fiber to the home networks. The RAM system according to some embodiments of the present invention organizes this process by assigning bundles to fixed locations (which may be matrixed or otherwise logically arranged) while simplifying the bundling and unbundling process to an easy to use manual push-pull fastener. In some embodiments, this may allow a technician to easily access any fiber stored with a reduced risk of tangling or damaging any of the other unassigned fibers. According to some embodiments, the foam or other soft fiber contact pad serves to provide a secure hold on the fibers without damaging the fibers. Some embodiments of the present invention as illustrated may allow the use of smaller fiber enclosures and the use of less skilled technicians in the field.

While the RAM system 100 and clips 140 are described above with regard to prescribed positioning and locating schema, according to some embodiments, RAM systems and clips as described herein may be employed without such schema, predesignation or fiber tracking aspects.

Figure 10:
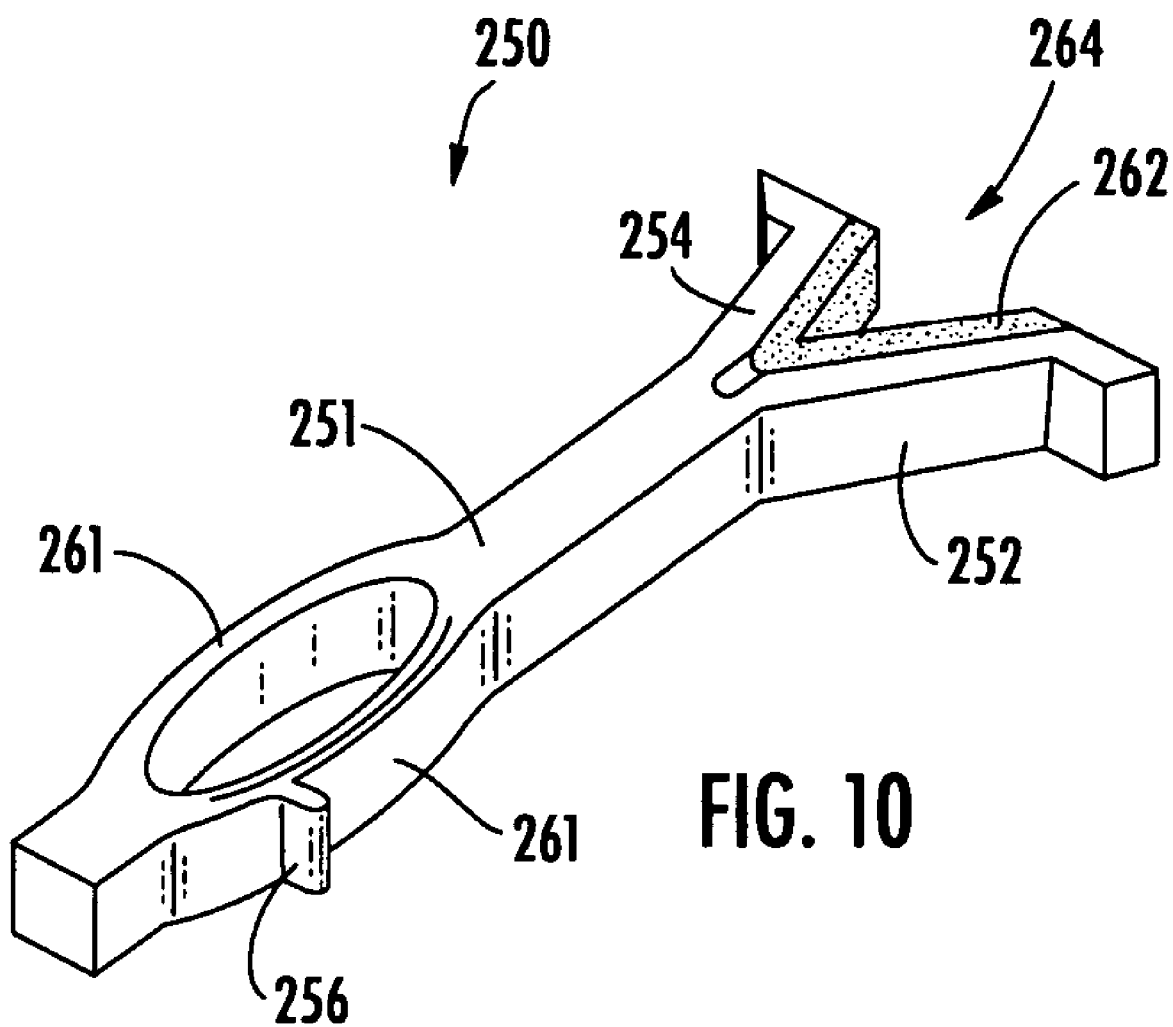
FIG. 10 is a rear perspective view of a clip member according to further embodiments of the present invention.

With reference to FIG. 10, a clip member 250 according to further embodiments of the present invention is shown therein. The clip member 250 includes an integrally formed (e.g., integrally molded) clip member body 251. The body 251 includes opposed fingers 252, 254 corresponding to the clip arm sections 152A, 154A. According to some embodiments and as illustrated, the fingers 252, 254 are angled outwardly when in a released state. Biasing structures 261 (e.g, leaf springs) and a stop structure 256 are integrally formed in the rear portion of the body 251. A pad 262 corresponding to the pad 162 is secured to and between the fingers 252, 254.

The clip member 250 can be used in the same or similar manner as the clip member 150 in combination with the housing 142, for example. In this case, the biasing structures 261 will provide interference fit loading between the clip body 251 and the housing 142. The resilient angled fingers 252, 254 may also provide an interference load when the clip member 250 is not in the open position and may serve to open the receiving slot 264 when the clip member 250 is in the open position.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An optical fiber random access management (RAM) system for use with an optical fiber termination device configured to selectively couple a first plurality of optical fibers to a second plurality of optical fibers, the RAM system comprising:
   a clip holder configured to be mounted proximate the optical fiber termination device; and
   a plurality of clips positioned on the clip holder, wherein each of the clips is configured to releasably hold ends of a designated subset of the first plurality of optical fibers to provide access to a selected one of the ends of the subset of the first plurality of optical fibers within a predetermined one of the clips to couple the selected one of the ends of the subset of the first plurality of optical fibers to a corresponding designated one of the second plurality of fibers;
   wherein each clip includes a clip member including a pair of opposed clip arms defining a receiving slot therebetween, and the clip member is selectively movable between an open position, wherein the pair of opposed clip arms are separated or separable to permit insertion of a bundle of optical fibers into the receiving slot, and a closed position, wherein the pair of opposed clip arms are held together to secure a bundle of optical fibers in the receiving slot.

2. The RAM system of claim 1 wherein each clip is manually operable.

3. The RAM system of claim 1 wherein the clips are positioned on the clip holder so as to define an ordered array of the clips.

4. The RAM system of claim 1 wherein the clips are configured and arranged on the clip holder to provide a nominal spacing between adjacent ones of the clips of at least about 1 inch.

5. The RAM system of claim 1 wherein each clip further includes a clip housing, the clip member thereof is mounted on the clip housing, and the clip member is slidable with respect to the clip housing between the open position and the closed position.

6. The RAM system of claim 5 wherein the clip further includes a biasing member operative to load the clip member against the clip housing to provide an interference fit between the clip member and the clip housing to hold the clip member in at least one of the open and closed positions.

7. The RAM system of claim 5 including a biasing structure integrally formed with the clip member operative to load the clip member against the clip housing to provide an interference fit between the clip member and the clip housing to hold the clip member in at least one of the open and closed positions.

8. The RAM system of claim 5 wherein each clip housing defines a slide channel within which the clip member slides between its open and closed positions.

9. The RAM system of claim 5 wherein each clip member has a slide stroke length of between about 0.5 and 1.5 inches from its closed position to its open position.

10. The RAM system of claim 5 wherein each clip includes a stop structure to limit a sliding distance of the clip member with respect to the clip housing.

11. The RAM system of claim 5 wherein at least one of the clip arms of each clip is formed of a bendable material to enable cantilevered bending of the at least one clip arm when the respective clip member is in its open position.

12. The RAM system of claim 1 wherein each clip includes a contact pad mounted on a clip arm thereof and configured to engage a plurality of optical fibers in the receiving slot, the clip arm is formed of a first material having a first hardness, and the pad is formed of second material having a second hardness that is softer than the first hardness.

13. The RAM system of claim 12 wherein the second hardness is between about 3 and 25 Shore A.

14. The RAM system of claim 1 further including at least one spool configured to be mounted in and/or on the optical fiber termination support device to receive and guide the first plurality of optical fibers.

15. The RAM system of claim 1 wherein:
   the first plurality of optical fibers are subscriber optical fibers associated with respective subscriber locations; and
   the second plurality of optical fibers are coupled to one or more optical splitters associated with one or more optical feed cables coupled to a central office of a telecommunications provider.

16. An optical fiber termination assembly including the RAM system of claim 1 and further comprising:
   a termination support structure, wherein the clip holder is mounted proximate the termination support structure;
   at least one optical splitter mounted proximate the termination support structure;
   at least one splice tray mounted proximate the termination support structure;
   at least one spool mounted proximate the termination support structure;
   the first plurality of optical fibers including a plurality of subsets of optical fibers, wherein the first plurality of optical fibers extends around a portion of the spool and each of the subsets of optical fibers of the first plurality of optical fibers is releasably held in a respective one of the plurality of clips; and
   the second plurality of optical fibers, wherein the second plurality of optical fibers is coupled to the at least one optical splitter.

17. The optical fiber termination assembly of claim 16 wherein the optical fiber termination assembly is a splitter cabinet.

18. An optical fiber clip for managing loose individual optical fibers, the clip comprising:
    a clip housing; and
    a clip member mounted on the clip housing, the clip member including a pair of opposed clip arms defining a receiving slot therebetween, wherein the clip member is selectively manually slidable with respect to the clip housing between an open position, wherein the pair of opposed clip arms are separated or separable to permit insertion of a bundle of optical fibers into the receiving slot, and a closed position, wherein the pair of opposed clip arms are held together to secure a bundle of optical fibers in the receiving slot.

19. The optical fiber clip of claim 18 including a biasing member operative to load the clip member against the clip housing to provide an interference fit between the clip member and the clip housing to hold the clip member in at least one of the open and closed positions.

20. The optical fiber clip of claim 18 wherein the clip housing defines a slide channel within which the clip member slides between its open and closed positions.

21. The optical fiber clip of claim 18 including a stop structure to limit a sliding distance of the clip member with respect to the clip housing.

22. The optical fiber clip of claim 18 wherein at least one of the clip arms is formed of a bendable material to enable cantilevered bending of the at least one clip arm when the clip member is in its open position.

23. The optical fiber clip of claim 18 including a contact pad mounted on at least one of the clip arms and configured to engage the bundle of unterminated subscriber optical fibers in the receiving slot, wherein the at least one clip arm is formed of a first material having a first hardness, and the pad is formed of second material having a second hardness that is softer than the first hardness.

24. A method for managing optical fibers in an optical fiber termination device wherein a first plurality of optical fibers is to be selectively coupled to a second plurality of optical fibers, the method comprising:
    providing an optical fiber random access management (RAM) system proximate the optical fiber termination device, the RAM system including a clip holder and a plurality of manually operable clips mounted on the clip holder;
    capturing ends of a designated subset of the first plurality of optical fibers in a predetermined one of the clips; thereafter
    selectively releasing and removing a selected one of the ends of the subset of the first plurality of optical fibers from the predetermined clip; and thereafter
    coupling the selected one of the ends of the subset of the first plurality of optical fibers to a corresponding designated one of the second plurality of fibers;
    wherein each clip includes a clip member including a pair of opposed clip arms defining a receiving slot therebetween, the method including:
        moving a selected clip member into an open position, wherein the pair opposed clip arms thereof are separated or separable to permit insertion of ends of a designated subset of the first plurality of optical fibers into the receiving slot; thereafter
        inserting the ends of the designated subset of the first plurality of optical fibers into the receiving slot while the selected clip member is in the open position; and thereafter
        moving the selected clip member into a closed position while ends of a designated subset of the first plurality of optical fibers are located in the receiving slot, wherein the pair of opposed clip arms thereof are held together to secure the ends of a designated subset of the first plurality of optical fibers in the receiving slot.

25. The method of claim 24 wherein:
    the first plurality of optical fibers are subscriber optical fibers associated with respective subscriber locations; and
    the second plurality of optical fibers are coupled to one or more optical splitters associated with one or more optical feed cables coupled to a central office of a telecommunications provider.

26. The method of claim 24 including:
    capturing ends of a second designated subset of the first plurality of optical fibers in a second predetermined one of the clips; thereafter
    selectively releasing and removing a selected one of the ends of the second subset of the first plurality of optical fibers from the second predetermined clip; and thereafter
    coupling the selected one of the ends of the second subset of the first plurality of optical fibers to a second corresponding designated one of the second plurality of fibers.

27. The RAM system of claim 24 wherein each clip further includes a clip housing and the clip member thereof is mounted on the clip housing, and moving the selected clip member into the open and closed positions includes sliding the selected clip member with respect to the clip housing.

28. An optical fiber random access management (RAM) system for use with an optical fiber termination device configured to selectively couple a first plurality of optical fibers to a second plurality of optical fibers, the RAM system comprising:
    a clip holder configured to be mounted proximate the optical fiber termination device; and
    a plurality of clips positioned on the clip holder, wherein each of the clips is configured to releasably hold ends of a designated subset of the first plurality of optical fibers to provide access to a selected one of the ends of the subset of the first plurality of optical fibers within a predetermined one of the clips to couple the selected one of the ends of the subset of the first plurality of optical fibers to a corresponding designated one of the second plurality of fibers;
    wherein each clip includes a contact pad mounted on a clip arm thereof and configured to engage a plurality of optical fibers in the receiving slot, the clip arm is formed of a first material having a first hardness, and the pad is formed of second material having a second hardness that is softer than the first hardness.

* * * * *